UNITED STATES PATENT OFFICE.

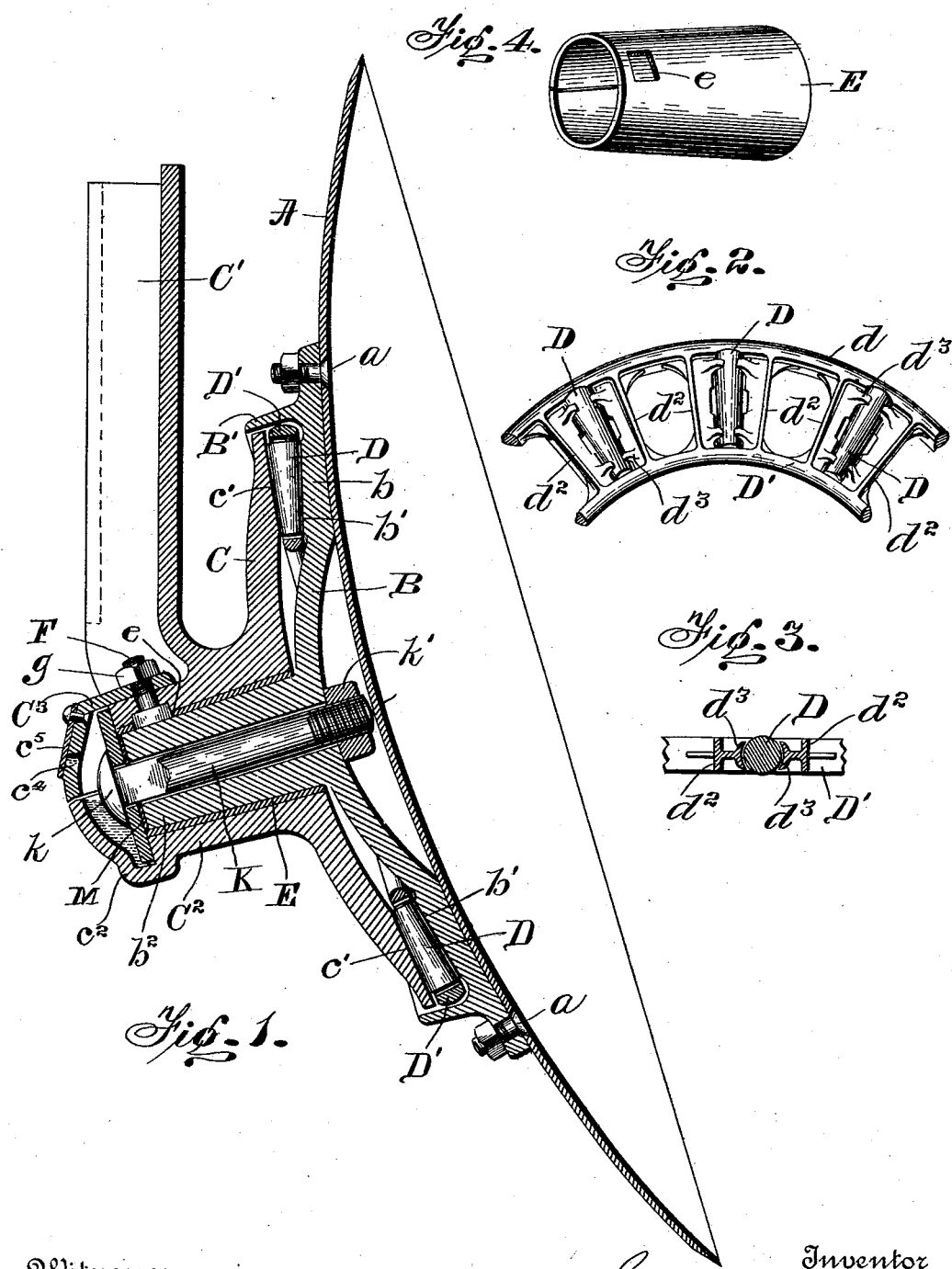

IRA A. WEAVER, OF MOLINE, ILLINOIS, ASSIGNOR TO DEERE & COMPANY, A CORPORATION OF ILLINOIS.

DISK-BEARING.

SPECIFICATION forming part of Letters Patent No. 713,027, dated November 4, 1902.

Application filed May 31, 1900. Serial No. 18,632. (No model.)

*To all whom it may concern:*

Be it known that I, IRA A. WEAVER, a citizen of the United States, residing at Moline, in the county of Rock Island and State of Illinois, have invented certain new and useful Improvements in Disk-Bearings; and I do hereby declare the following to be a full, clear, and exact description of the invention, such as will enable others skilled in the art to which it appertains to make and use the same.

This invention relates to disk-bearings, and more particularly to bearings for disk plows.

The primary object of the invention is to provide a simple and efficient bearing for the cutting-disk of rotary plows and similar implements which will be more durable and cause less friction than the bearings heretofore used.

The invention will first be hereinafter more particularly described with reference to the accompanying drawings, which form a part of this specification, and then pointed out in the claims at the end of the description.

In said drawings, in which corresponding parts in different views are denoted by similar letters of reference, Figure 1 represents in vertical sectional elevation the cutting-disk and standard of a rotary or disk plow with a bearing embodying my invention applied thereto. Fig. 2 is a detail plan view of a portion of a roller cage or retainer for holding and separating the antifriction-rollers. Fig. 3 is a detail sectional view through one of the antifriction-rollers and a portion of the roller-cage, and Fig. 4 is a perspective view of a removable bushing for the hub of the cutting-disk.

In said drawings, the letter A denotes an ordinary concavo-convex cutting-disk of a rotary or disk plow, and B a casting, to which the disk is attached by bolts $a$ $a$. The casting B is provided on its rear side with a suitable circular or annular raceway $b'$ to form a bearing for the antifriction-rollers D, which may be fitted and held between said raceway and a corresponding raceway $c'$ on the front face of an annular plate C, carried by or springing from the plow standard or hanger C', said casting being also provided with a central tubular boss or journal $b^2$ and with a circumferentially-disposed flange or hood B' overlying or encircling said raceways, so as to serve as a dust-guard to prevent dirt or stubble from entering the raceways.

The plow standard or hanger C' is provided with a tubular shell $C^2$, in which the boss or journal $b^2$ of the casting B has its bearings, thus journaling the hub of the cutting-disk in said shell. The sleeve or opening through the shell is so formed and arranged as to give the cutting-disk the necessary inclination to the earth to adapt it to perform the functions of a plow and may be cast integrally with the hanger or secured thereto in any proper manner. To prevent undue wear of the boss or journal $b^2$ on the interior of the sleeve or shell $C^2$, a removable bushing or metal lining E, Figs. 1 and 4, may be employed and may be easily and cheaply replaced by a new lining when worn. For conveniently holding said lining in place within the sleeve a bolt F, having a square or polygonal head engaging a correspondingly-shaped recess or opening $e$ in the bushing, is passed through an aperture in the sleeve or shell $C^2$ and also through a registering aperture in a cap or cover $C^3$, fitting over the outer end of said sleeve, and has a nut $g$ screwed on its projecting screw-threaded end, so as to confine the bushing in a fixed position within the sleeve and prevent rotation thereof. The sleeve $C^2$ is preferably formed integrally with the annular flange or disk-like portion C, having the raceway $c'$ in the front face thereof confronting the corresponding raceway $b'$ on the back of the annular plate or portion $b$ of the casting B, said flange C being of such size as to adapt it to fit within the encircling flange or dirt-guard B' of the casting B. The annular flanges or race-plates C and $b'$ on the shell $C^2$ and casting B, respectively, are preferably formed integrally with the shell and hanger and the casting B, respectively, though they may be formed in separable parts and secured to said shell and casting in any proper manner to form suitable raceways for the antifriction-rollers D, interposed between the raceways. Said rollers are preferably conical in form to adapt them to conform to the correspondingly flaring or divergent surfaces of the raceways and are designed to receive the lateral pressure exerted by the earth on the face of the cutting-disk, while the hub receives the upward pressure. The rollers or antifriction devices may be of any suitable construction adapted to fit suitable raceways constructed to accommodate the same; but I preferably employ conical rollers with raceways formed to correspond, and in order to lessen the number of bearing-points and reduce the friction to a minimum and at the same time to keep the rollers in proper position relative to the axis of rotation, as well as to prevent them from falling out when the hub or disk, with the casting B, is removed or detached from the standard, and also to facilitate the removal and reassembling of the parts, the rollers are preferably loosely confined in a cage or retainer and separator, which is denoted by the letter $D'$ in the drawings. This retainer may be of any suitable construction, but in the form shown consists of the concentric ring portions $d\ d'$, connected by a series of ribs or webs $d^2\ d^2$, having bendable fingers $d^3$ thereon, between which the rollers are fitted and confined, as shown more clearly in Fig. 3. Each rib may have two or more of such fingers confronting correspondingly-shaped fingers on the adjacent web or rib, adapted to partially embrace the roller and confine the same between the confronting fingers with as few points of contact as possible in order that the roller may be confined loosely within certain limits without appreciable frictional contact with the retainers. The rollers may be thus confined radially between the concentric rings at any desired distance apart and held parallel with the line of rotation, thus providing an antifriction-bearing for the disk and at the same time avoiding contact of the rollers with each other, as is common with ball-bearings as heretofore constructed. The ribs between which the rollers are confined may also be so formed as to collect any dust or grease that might work down between the races and find its way to the hub-bearings. For retaining the spindle or journal of the casting B within the sleeve or shell $C^2$ at the foot of the hanger a fastening-bolt K, having a head $k$ at one end and screw-threaded at the other, is passed through an aperture in a plate or washer L and through the tubular boss or journal $b^2$ and has a nut $k'$ fitted on its screw-threaded end for tightening the head of the bolt against the washer, which washer in turn abuts the outer end of the sleeve $C^2$ or a shoulder on said sleeve, and thus the boss or journal is confined within the sleeve or socket bearing of the shell in such manner that the boss or journal $b^2$ and the bolt and washer may rotate together, this being conveniently accomplished by providing the bolt with a square or polygonal portion fitting a correspondingly-shaped opening through or partially through said washer and boss, which construction prevents the nut on the end of the bolt from working loose. However, it may be found desirable in some cases to permit the boss or journal to rotate on or independently of the bolt. In the construction shown the shank or body of the bolt has a polygonal portion, which passes through a correspondingly-shaped aperture in the washer L and extends into a correspondingly-shaped polygonal portion of the opening through the boss or journal $b^2$; but other constructions may be employed, and hence I do not desire to be limited to the specific construction or arrangement shown or described. I also preferably interpose a suitable washer M between the metallic plate or washer L and the outer end of the journal $b^2$, which may be removed to compensate for wear. For lubricating purposes the lower half of the opening in the sleeve or shell $C^2$ at its outer end is closed by an upwardly-extending part $c^2$, forming a pocket to receive oil, whereby the hub and its working parts may be kept in a bath of oil, as indicated by the dotted line in Fig. 1. The upper half of the opening or end of the shell may be closed by a removable cap or cover $C^3$, having an oil-hole $c^4$ therein which is protected by a flap $c^5$.

I thus provide a very efficient and durable antifriction-bearing for the cutting-disks of rotary plows and other agricultural implements in which such disks are employed, adapting the disk to receive the side thrust without causing undue friction, and thereby increasing the draft, and the several parts are so combined and arranged that they may be readily taken apart and a broken or worn part replaced by a new one.

By reason of the flaring or outwardly-divergent confronting surfaces of the roller-races and the conical somewhat-elongated form of the rollers fitting between the same a somewhat-extended roller-bearing surface is provided in the path of rotation of the rollers to more effectively resist the lateral pressure or sidewise thrust of the disk without causing undue friction, though it may be found desirable in some cases, and especially in the use of disks of small size, to use a series of balls properly caged and held in proper position parallel with the line of rotation, and hence I do not desire to be restricted to the specific form of antifriction devices shown, though the latter are desirable and preferable in the practical application of the invention. It will also be understood that other means may be employed for separating and maintaining the rollers or antifriction devices in relatively fixed positions parallel with the line or rotation, though the described form of retainer and separator is especially useful in connection with the conical rollers and is also desirable as a dust or dirt collector to prevent the entrance of dirt to the hub-bearings, the ribs having shelf-like portions to form receptacles or pockets for dust or grease that may collect upon the retainer. For the purpose of fitting the rollers in the retainer the fingers may be left standing at an angle to the web or rib to provide room for the insertion of the roller between the confronting fingers, after which said fingers may be bent over, so as to partially embrace the roller and hold it in its proper place.

Having thus fully described my invention, what I claim as new, and desire to secure by Letters Patent of the United States, is—

1. In a disk plow, the combination with a relatively fixed support, and a disk rotatably secured thereto, of an antifriction-bearing for the disk comprising an annular series of rollers interposed between confronting bearing-surfaces on said support and the back of the disk, said rollers being radially disposed at an angle to the axis of the disk, substantially as described.

2. In a disk plow, the combination with a relatively fixed support, and a disk journaled thereon, of an annular series of rollers and a separating device therefor interposed between confronting raceways, one of which is carried by said support and the other revolving with the disk at a point between its hub and circumference, substantially as described.

3. In a disk plow, the combination with the hanger having a disk rotatably secured thereto, and a race-plate carried by said hanger having an annular roller-bearing surface thereon, of a race-plate arranged to rotate with the disk having a similar bearing-surface confronting the former, a series of rollers interposed between said bearing-surfaces, and radially disposed at an angle to the axis of the disk, and means for holding the rollers at prescribed distances apart between said bearing-surfaces, substantially as described.

4. In a disk plow, the combination with a relatively fixed support, and a disk journaled thereon, of a single annular series of antifriction devices interposed between confronting raceways, one of which is carried by said support and the other revolving with the disk at a point between its hub and circumference, together with a device for separating and holding said antifriction devices in relatively fixed positions in the line of rotation, substantially as described.

5. In combination with the disk-support and the rotary disk journaled thereon, an annular raceway on the back of the disk revolving therewith, a raceway carried by said support confronting the first-mentioned raceway, and a series of conical rollers interposed between said raceways, substantially as described.

6. In combination with the disk-support and the rotary disk journaled thereon, an annular raceway on the back of the disk revolving therewith, a raceway carried by said support confronting the first-mentioned raceway, and a series of conical rollers loosely confined in a retainer and separator interposed between said raceways, substantially as described.

7. In combination with the supporting-standard and the rotary disk journaled thereon, an annular bearing-surface carried by said standard, a similar confronting bearing-surface revolving with the disk, and a series of conical rollers radially arranged at intervals between said bearing-surfaces and adapted to receive the sidewise thrust of the disk, substantially as described.

8. In combination with the supporting-standard, and a rotary disk journaled thereon, an annular inclined bearing-surface carried by said standard, a similar oppositely-inclined confronting bearing-surface revolving with the disk, and a series of conical rollers interposed between said bearing-surfaces, substantially as described.

9. An antifriction-bearing for rotary disk plows, comprising a suitable standard having a socket-bearing for the hub of the disk, and a circular race-plate thereon having an annular raceway faced toward the disk, a casting or bracket having a disk secured thereto and provided with a tubular boss forming the hub of the disk rotatably secured within said socket-bearing and with an annular raceway confronting said first-mentioned raceway, a roller-cage for holding and separating the rollers located between said raceways, and a series of conical rollers loosely confined in said cage in contact at diametrically opposite points with said confronting raceways, substantially as described.

10. In combination with the rotary disk, the standard having the tubular shell in which the hub of the disk is journaled, the lower part of said shell being provided with an upward integral extension to form a pocket for oil, and a cap having an oil-inlet therein adapted to close the upper open end of the shell; whereby the hub may be kept in a bath of oil, substantially as described.

11. The roller-cage for the antifriction-rollers, consisting of a pair of concentric ring portions connected at intervals by a series of ribs having fingers projecting therefrom in opposite directions so as to confine the rollers between confronting fingers on adjacent ribs, substantially as described.

12. In combination with the socket-bearing and the rotary disk having its hub journaled therein, the removable bushing encircling the hub within said socket-bearing, and means for holding said bushing stationary and rotatively confining the hub therein, substantially as described.

In testimony whereof I affix my signature in presence of two witnesses.

IRA A. WEAVER. [L. S.]

Witnesses:
CHAS. H. POPE,
SCHILLER HOSFORD.